(12) United States Patent
Poisner

(10) Patent No.: US 6,742,073 B1
(45) Date of Patent: May 25, 2004

(54) BUS CONTROLLER TECHNIQUE TO CONTROL N BUSES

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 09/746,162

(22) Filed: Dec. 26, 2000

(51) Int. Cl.$^7$ ................................................ G06F 13/40
(52) U.S. Cl. ......................... 710/305; 710/63; 710/52
(58) Field of Search ............................... 710/1, 52, 63, 710/100, 305, 310; 365/189.01; 709/253; 370/463; 711/100; 712/32

(56) References Cited

U.S. PATENT DOCUMENTS 5,659,696 A * 8/1997 Amini et al.
5,673,400 A * 9/1997 Kenny
6,484,218 B1 * 11/2002 Pipho

* cited by examiner

Primary Examiner—Gopal C. Ray
(74) Attorney, Agent, or Firm—Jeffrey B. Huter

(57) ABSTRACT

A technique for operating a bus controller to control N buses, each bus capable of having at least one device connected thereto, N being an integer greater than 1, includes reading a descriptor inputted to the bus controller and determining from the read descriptor whether a data transfer operation is a read operation or a write operation. The descriptor may indicate whether the device to be accessed is connected to a first bus or a second bus or alternatively, information from the descriptor may be compared with a separate list to determine if the device to be accessed is connected to the first bus or the second bus.

35 Claims, 3 Drawing Sheets

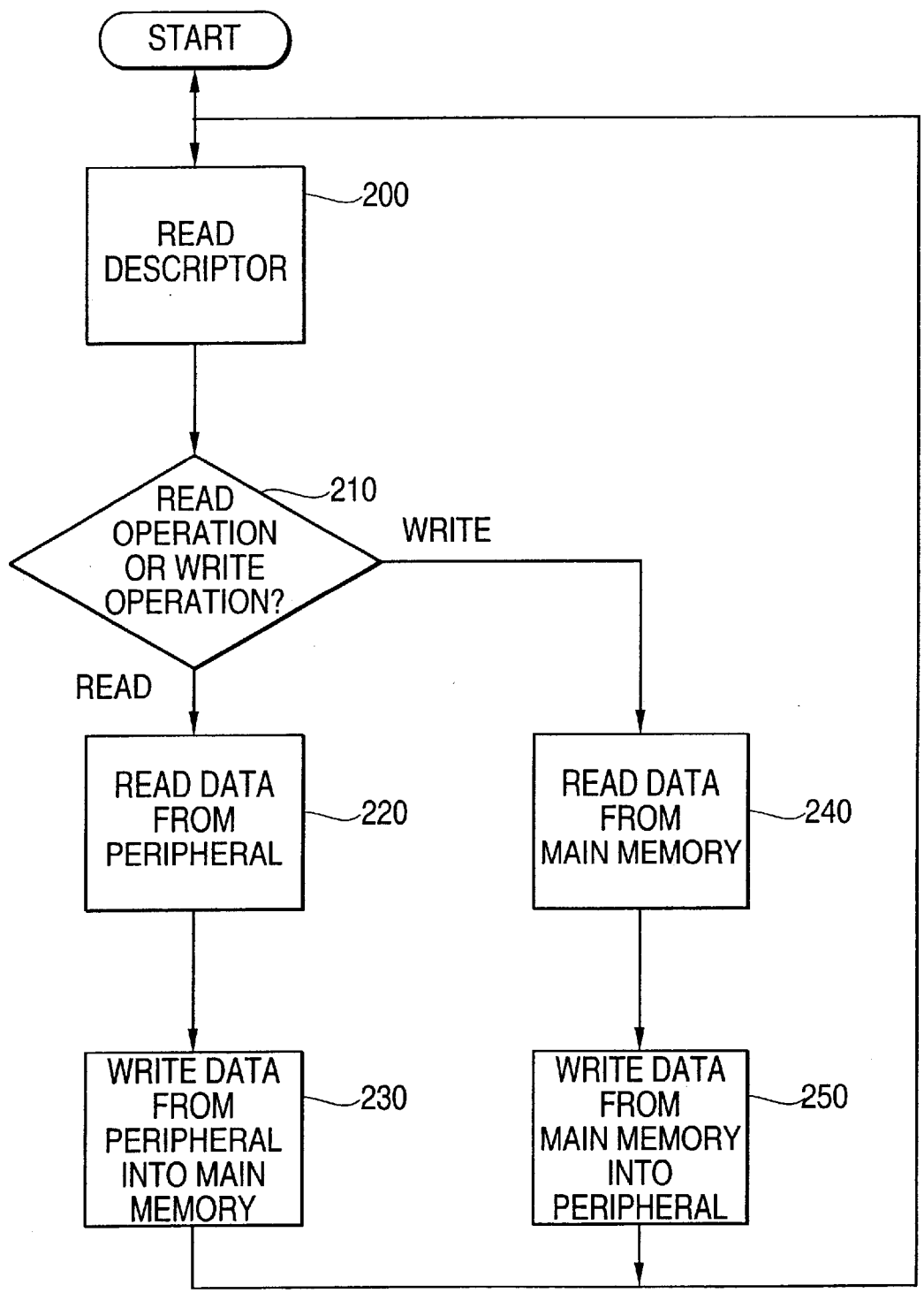

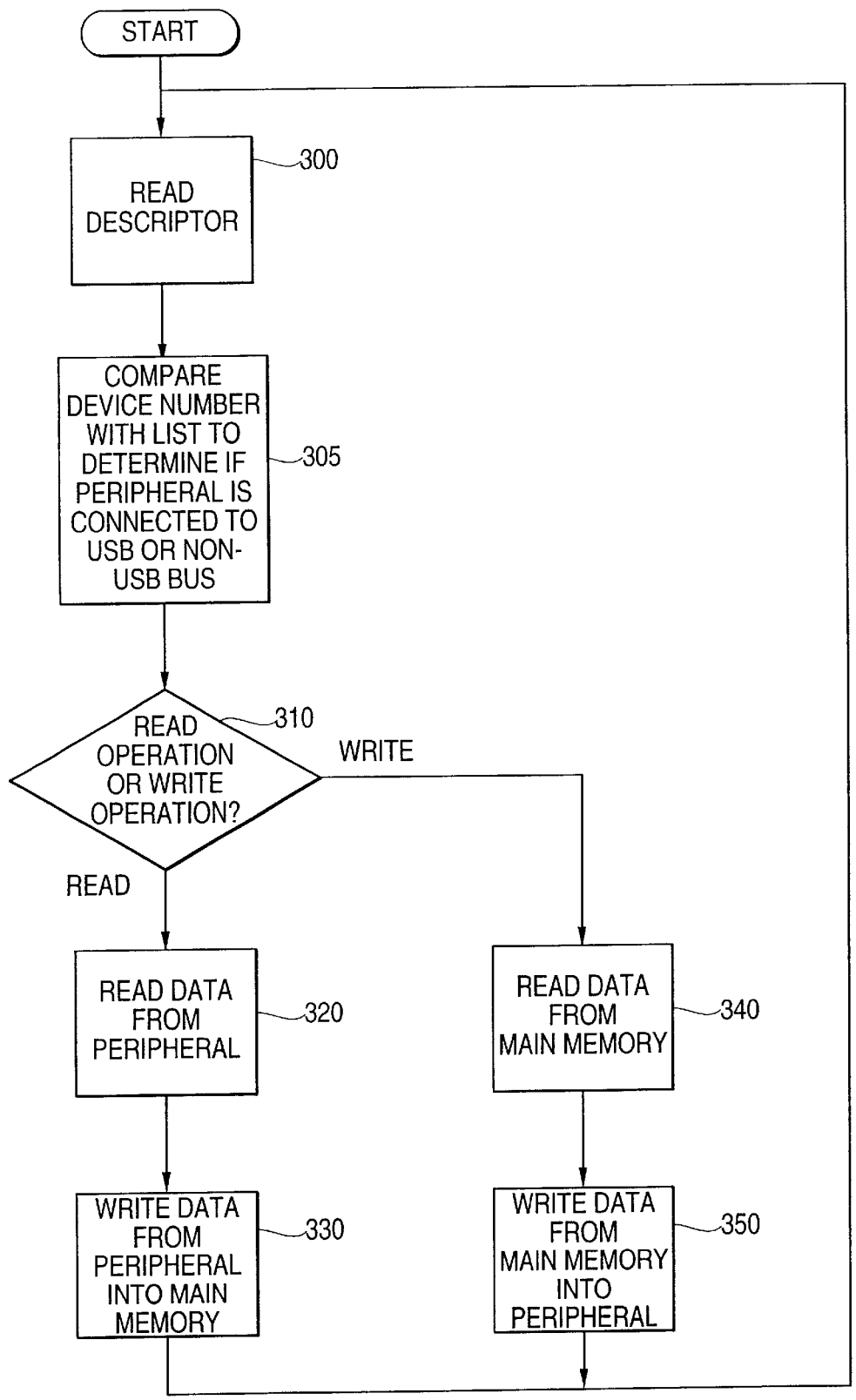

BUS CONTROLLER TECHNIQUE TO CONTROL N BUSES

FIELD

The present invention relates to a bus controller technique in which a bus controller for a first bus may access devices, such as peripheral devices, not connected to the first bus but rather connected to another bus.

BACKGROUND

In some chipsets, an integrated USB (Universal Serial Bus) bus controller is used to move data to and from USB devices connected to the USB bus via USB ports. The controller includes a variety of ports and the data that is sent or received on the ports is grouped into packets.

Unfortunately, such bus controllers, as presently configured, can only interface with devices connected to the USB ports and cannot interface with devices connected to other ports which are connected to buses other than the USB bus.

Accordingly, it would be advantageous to have a bus controller for a first bus which was capable of accessing devices connected to the first bus as well as being capable of accessing devices which are connected to buses other than the first bus.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2 is a flowchart illustrating an example of the operation of one example embodiment in accordance with the technique of the present invention.

FIG. 3 is a flowchart illustrating an example of the operation of another example embodiment in accordance with the technique of the present invention.

DETAILED DESCRIPTION

Figure 1:
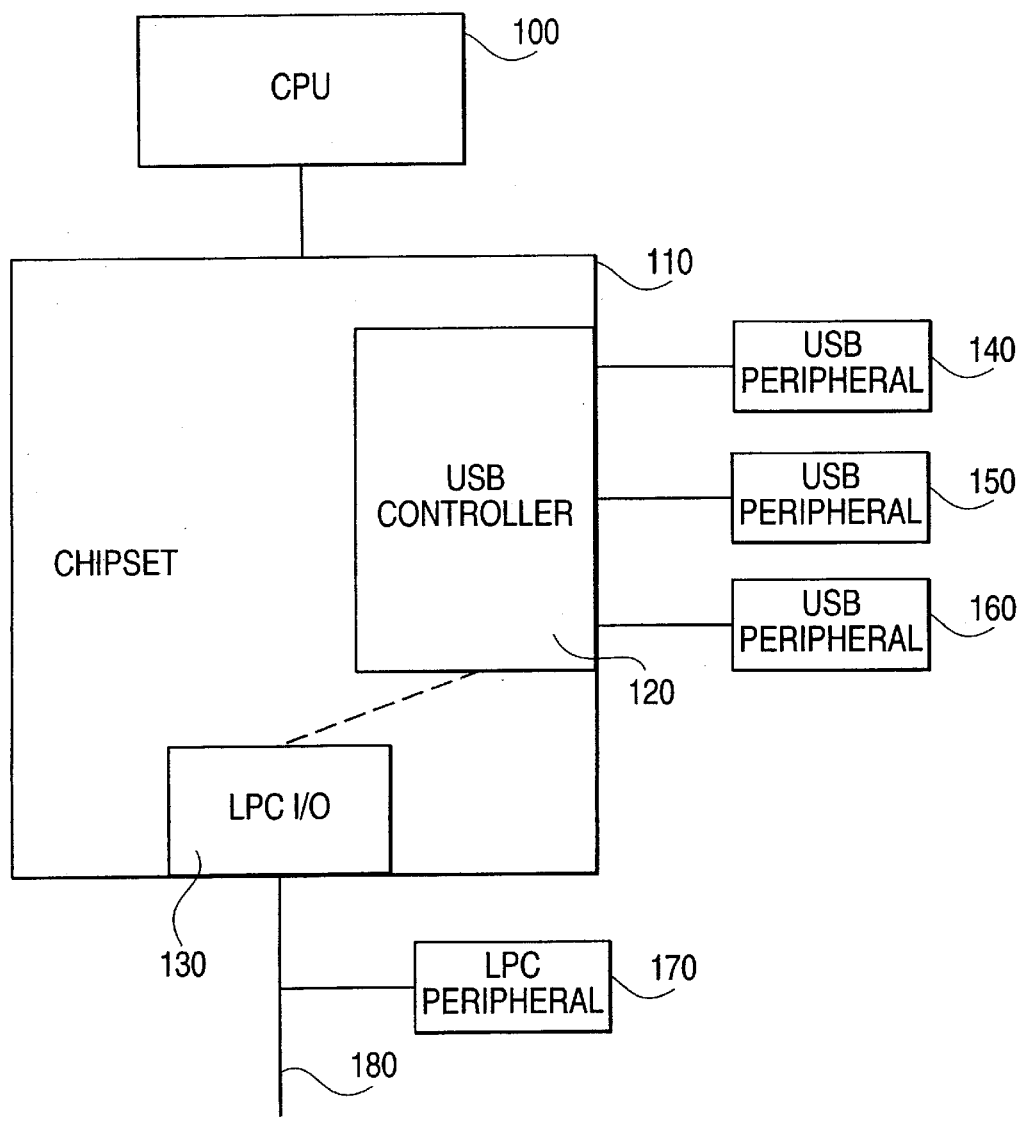
FIG. 1 is a block diagram of an example system which may operate in accordance with the technique of the present invention.

Before beginning a detailed description of the subject invention, mention of the following is in order. When appropriate, like reference numerals and characters may be used to designate identical, corresponding, or similar components in differing drawing figures. In addition, in the detailed description to follow, sizes/models/values/ranges may be given, although the present invention is not limited thereto.

Furthermore, while the examples discussed below refer to a USB controller in a chipset operating with USB devices and LPC devices, it is to be understood that the present invention is not limited thereto. For example, the controller does not specifically need to reside within a chipset nor is the present invention limited to USB controllers operating with USB devices and LPC devices but rather, the present invention may operate with any bus controller and devices connected to the bus controller's bus and devices connected to another bus. In addition, the present invention is not limited to peripherals or peripheral devices but rather may be used with any bus connected devices.

FIG. 1 is a block diagram of an example system which may operate in accordance with the technique of the invention. As illustrated in FIG. 1, a CPU 100 is connected to a chipset 110. A USB controller 120 and LPC I/O unit 130 are shown as being within the chipset 110. USB peripherals 140, 150, and 160 are connected to the chipset 110 via a USB bus (not shown) while an LPC peripheral 170 is connected to the LPC I/O unit 130 via an LPC bus 180. Many other elements have been omitted from the drawing figure for the sake of simplicity and so as not to obscure the present invention.

As illustrated in FIG. 2, initially, in box 200, the USB controller 120 reads a descriptor which is typically stored in a main memory (not shown). The descriptor includes the following pieces of information:

1. a device number which indicates which peripheral is to be accessed;
2. a read/write indication which indicates if the data is to be read from or written into the peripheral to be accessed;
3. a buffer pointer which indicates the location in the main memory for the data to be read from or written into the peripheral to be accessed; and
4. a USB/non-USB indication which indicates whether the peripheral to be accessed is a USB peripheral (that is, is connected to the USB bus) or is a non-USB peripheral (that is, is not connected to the USB bus but rather is connected to another bus), for example. More generally, an indication is provided as to whether the peripheral to be accessed is connected to a first bus or a second bus.

Additionally, the descriptor may contain other pieces of information such as the size in bytes of the data to be read from or written into the peripheral to be accessed or other control/status information.

In box 210, a determination is made as to whether the data transfer operation is a read operation or a write operation.

Upon a determination in box 210 that the data transfer operation is a read operation, then the USB controller 120 reads the data from the peripheral to be accessed in box 220. The USB controller 120 knows which peripheral is to be accessed from the descriptor and knows the bus to transfer the data from the USB/non-USB indication also contained within the descriptor.

In box 230, the USB controller 120 then writes the data read from the accessed peripheral into the main memory starting at the location in the main memory indicated by the buffer pointer contained within the descriptor.

On the other hand, upon a determination in box 210 that the data transfer operation is a write operation, then the USB controller 120, in box 240, reads data from the main memory starting at the location in the main memory indicated by the buffer pointer contained within the descriptor.

In box 250, the controller 120 then writes the data read from the main memory to the accessed peripheral. The USB controller knows which peripheral is to be accessed from the descriptor and knows which bus to use from the USB/non-USB indication also contained within the descriptor. That is, if the USB/non-USB indication indicates a non-USB transaction, then the transaction does not occur on the USB bus but rather occurs on an alternative bus, such as the LPC bus.

It is to be noted that the USB/non-USB indication may have a field which is greater than one bit so that several different alternative buses may be selected in place of the USB bus.

FIG. 3 is a flowchart illustrating an example of the operation of another embodiment in accordance with the technique of the present invention.

As illustrated in FIG. 3, in box 300, the USB controller 120 reads a descriptor which is typically stored in a main memory (not shown). The descriptor includes the following pieces are information:

1. a device number which indicates which peripheral is to be accessed;
2. a read/write indication which indicates if the data is to be read from or written into the peripheral to be accessed; and
3. a buffer pointer which indicates the location in the main memory for the data to be read from or written into the peripheral.

As with the previous embodiment, the descriptor may contain other pieces of information such as the size in bytes of the data to be read from or written into the peripheral to be accessed or other control/status information. Note that in this embodiment, the descriptor does not have the USB/non-USB indication as in the previous embodiment.

In box 305, the USB controller 120 compares the device number contained within the descriptor with a separate list to determine if the device number corresponds to a peripheral connected to the USB bus or corresponds to a peripheral which is connected to another, non-USB, bus.

The comparison list may be stored in either the main memory or an another storage location such as a register file. Each entry in the list has two fields, namely, a first field which indicates the device number and a second field which indicates which bus it is connected to. If the list is in the main memory, the USB controller 120 reads the list and compares each entry with the device number of the current descriptor.

Several techniques may be used to search the list. The simplest but slowest technique is to read each entry. A faster technique would be to have the list pre-sorted upon the list being created so as to allow the hardware to perform a binary search. If the list was stored in a register file, the controller 120 would again read the list (which is a much quicker operation with the register file as compared to the main memory).

Along with the techniques used to search the list in the main memory, the use of the register file to store the list allows for the use of a faster search technique such as designing the register file as a CAM (Content Addressable Memory) so as to reduce the search time to just one read. In a CAM, you present the data and the CAM determines whether or not that data is present in one of its registers. If so, then it outputs the stored data corresponding to the presented data and if not, it provides an output indicating that there is no stored data corresponding to the presented data.

Returning now to FIG. 3, in box 310, a determination is made as to whether the data transfer operation is a read operation or a write operation.

Upon a determination in box 310 that the data transfer operation is a read operation, then the USB controller 120 reads the data from the peripheral to be accessed in box 320. The USB controller 120 knows which peripheral is to be accessed from the descriptor and knows the bus to transfer the data from the list.

In box 330, the USB controller 120 then writes the data read from the accessed peripheral into the main memory starting at the location in the main memory indicated by the buffer pointer contained within the descriptor.

On the other hand, upon a determination in box 310 that the data transfer operation is a write operation, then the USB controller 120, in box 340, reads data from the main memory starting at the location in the main memory indicated by the buffer pointer contained within the descriptor.

In box 350, the controller 120 then writes the data read from the main memory to the accessed peripheral. The USB controller knows which peripheral is to be accessed from the descriptor and knows which bus to use from the list. That is, if the list indicates a non-USB transaction, then the transaction does not occur on the USB bus but rather occurs on an alternative bus indicated on the list, such as the LPC bus.

It is to be noted that, as the case of the first embodiment, several different alternative buses may be selected in place of the USB bus.

By utilizing the technique in accordance with the present invention, the USB controller can operate with both USB and non-USB devices. For example, some chipsets include a security chip which is connected to the LPC bus. Normally, a pre-boot path is provided through standard LPC mechanisms that the BIOS is fully cognizant of. However, the OS (Operating System), when it is resident, would be able to access the security chip as if it were a USB device. Thus, there's a great deal of flexibility in design when utilizing the technique in accordance with the present invention.

Furthermore, there are normally only a limited number of available USB ports. By utilizing the technique in accordance with the present invention, various other buses may be used for other devices, thereby allowing the use of the available USB ports to be optimized.

This concludes the description of the example embodiments. Although the present invention has been described with reference to example embodiments, it should he understood that numerous other modifications and embodiments can be devised by those skilled in the art that will fall within the spirit scope of the principles of this invention. More particular, reasonable variations and modifications are possible in the component parts and/or arrangements of the subject combination arrangement within the scope of the foregoing disclosure, the drawings, and the appended claims without departing from this period of the invention. In addition to variations and modifications and the component parts and/or arrangements, alternative uses will also be apparent to those skilled the art.

For example, as noted above, the present invention is not limited to USB controllers but rather may also be used with any other bus controllers, such as IEEE 1394 bus controllers (Fire Wire controllers) or IEEE 802.3 bus controllers (Ethernet controllers), for example.

What is claimed is:

1. A method of operating a bus controller to control N buses, each bus capable of having at least one device connected thereto, N being an integer greater than 1, the method comprising:

reading a descriptor inputted to the bus controller;
determining from the read descriptor whether a data transfer operation is a read operation or write operation;
if a read operation, reading data from a selected device using a selected bus and then writing the data read from the selected device into a memory starting at a selected location in the memory, all selections being in accordance with the read descriptor; and if a write operation, reading data from the memory starting at a selected location in the memory and then writing the data read from the memory into a selected device using a selected bus, all selections being in accordance with the read descriptor.

2. The method of claim 1, wherein the N buses comprise a USB (Universal Serial Bus) and a non-USB bus.

3. The method of claim 2, wherein the non-USB bus comprises an LPC (Low Pin Count) bus.

4. The method of claim 1, wherein the N buses comprise an IEEE 1394 bus and a non-IEEE 1394 bus.

5. The method of claim 4, wherein the non-IEEE 1394 bus comprises an LPC bus.

6. The method of claim 1, wherein the descriptor comprises:
  a device number which indicates which device is to be accessed;
  a read/write indication which indicates if the data is to be read from or written into the device to be accessed;
  a buffer pointer which indicates the location in the main memory for the data to be read from or written into the device to be accessed; and
  a buffer indication which indicates whether the device to be accessed is connected to a first bus or a second bus.

7. The method of claim 6, wherein the first bus comprises a USB bus and the second bus comprises a non-USB bus.

8. The method of claim 7, wherein the second bus comprises an LPC bus.

9. The method of claim 7, wherein the second bus comprises an LPC bus.

10. The method of claim 6, wherein the first bus comprises an IEEE 1394 bus and the second bus comprises a non-IEEE 1394 bus.

11. The method of claim 6, wherein the descriptor further comprises a size of the data to be read from or written into the device to be accessed.

12. A method of operating a bus controller to control N buses, each bus capable of having at least one device connected thereto, N being an integer greater than 1, the method comprising:
  reading a descriptor inputted to the bus controller;
  comparing information from the read descriptor with a list to determine if a selected device to be accessed is connected to a first bus or a second bus of the N buses;
  determining from the read descriptor whether a data transfer operation is a read operation or write operation;
  if a read operation, reading data from the selected device to be accessed using a selected bus and then writing the data read from the selected device into a memory starting at a selected location in the memory, all selections being in accordance with the read descriptor; and
  if a write operation, reading data from the memory starting at a selected location in the memory and then writing the data read from the memory into the selected device using a selected bus, all selections being in accordance with the read descriptor.

13. The method of claim 12, wherein the first and second buses respectively comprise a USB (Universal Serial Bus) and a non-USB bus.

14. The method of claim 13, wherein the non-USB bus comprises an LPC (Low Pin Count) bus.

15. The method of claim 12, wherein the first and second buses respectively comprise an IEEE 1394 bus and a non-IEEE 1394 bus.

16. The method of claim 15, wherein the non-IEEE 1394 bus comprises an LPC bus.

17. The method of claim 12, wherein the descriptor comprises:
  a device number which indicates which device is to be accessed;
  a read/write indication which indicates if the data is to be read from or written into the device to be accessed;
  a buffer pointer which indicates the location in the main memory for the data to be read from or written into the device to be accessed.

18. The method of claim 12, wherein the descriptor further comprises a size of the data to be read from or written into the device to be accessed.

19. A bus controller apparatus comprising:
  N buses, each bus capable of having at least one device connected thereto, N being an integer greater than 1;
  a memory to store data written therein and to output stored data;
  the bus controller having a descriptor inputted thereto, the bus controller reading the inputted descriptor;
  the bus controller determining from the read descriptor whether a data transfer operation is a read operation or write operation;
  the bus controller performing a read operation by reading data from a selected device using a selected bus and then writing the data read from the selected device into the memory starting at a selected location in the memory, all selections being in accordance with the read descriptor; and
  the bus controller performing a write operation by reading data from the memory starting at a selected location in the memory and then writing the data read from the memory into a selected device using a selected bus, all selections being in accordance with the read descriptor.

20. The apparatus of claim 19, wherein the N buses comprise a USB (Universal Serial Bus) and a non-USB bus.

21. The apparatus of claim 20, wherein the non-USB bus comprises an LPC (Low Pin Count) bus.

22. The apparatus of claim 19, wherein the N buses comprise an IEEE 1394 bus and a non-IEEE 1394 bus.

23. The apparatus of claim 22, wherein the non-IEEE 1394 bus comprises an LPC bus.

24. The apparatus of claim 19, wherein the descriptor comprises:
  a device number which indicates which device is to be accessed;
  a read/write indication which indicates if the data is to be read from or written into the device to be accessed;
  a buffer pointer which indicates the location in the main memory for the data to be read from or written into the device to be accessed; and
  a buffer indication which indicates whether the device to be accessed is connected to a first bus or a second bus.

25. The apparatus of claim 24, wherein the first bus comprises a USB bus and the second bus comprises a non-USB bus.

26. The apparatus of claim 25, wherein the second bus comprises an LPC bus.

27. The apparatus of claim 24, wherein the first bus comprises an IEEE 1394 bus and the second bus comprises a non-IEEE 1394 bus.

28. The apparatus of claim 27, wherein the second bus comprises an LPC bus.

29. The apparatus of claim 24, wherein the descriptor further comprises a size of the data to be read from or written into the device to be accessed.

30. A bus controller apparatus comprising:

N buses, each bus capable of having at least one device connected thereto, N being an integer greater than 1;

a memory to store data written therein and to output stored data;

the bus controller having a descriptor inputted thereto, the bus controller reading the descriptor;

the bus controller comparing information from the read descriptor with a list to determine if a selected device to be accessed is connected to a first bus or a second bus of the N buses;

the bus controller determining from the read descriptor whether a data transfer operation is a read operation or write operation;

the bus controller performing a read operation by reading data from the selected device to be accessed using a selected bus and then writing the data read from the selected device into the memory starting at a selected location in the memory, all selections being in accordance with the read descriptor; and the bus controller performing a write operation by reading data from the memory starting at a selected location in the memory and then writing the data read from the memory into the selected device using a selected bus, all selections being in accordance with the read descriptor.

31. The apparatus of claim 30, wherein the first and second buses respectively comprise a USB (Universal Serial Bus) and a non-USB bus.

32. The apparatus of claim 31, wherein the non-USB bus comprises an LPC (Low Pin Count) bus.

33. The apparatus of claim 31, wherein the non-IEEE 1394 bus comprises an LPC bus.

34. The apparatus of claim 30, wherein the first and second buses respectively comprise an IEEE 1394 bus and a non-IEEE 1394 bus.

35. The apparatus of claim 30, wherein the descriptor comprises:

a device number which indicates which device is to be accessed;

a read/write indication which indicates if the data is to be read from or written into the device to be accessed;

a buffer pointer which indicates the location in the main memory for the data to be read from or written into the device to be accessed.

* * * * *